United States Patent [19]
Hutchinson et al.

[11] Patent Number: 5,133,588
[45] Date of Patent: Jul. 28, 1992

[54] SEAT ASSEMBLY WITH INTEGRAL FUEL TANK

[75] Inventors: Wayne R. Hutchinson, Mayville; Richard D. Teal, Horicon, both of Wis.; Steven C. Wasson, Midland, Mich.; David R. Daniel, Midland, Mich.; Earl T. Moore, Midland, Mich.; Luis Lorenza, Midland, all of Mich.

[73] Assignee: Deere & Company, Moline, Ill.

[21] Appl. No.: 717,786

[22] Filed: Jun. 14, 1991

[51] Int. Cl.$^5$ .............................................. A47C 7/62
[52] U.S. Cl. .................................. 297/217; 297/191; 297/192
[58] Field of Search ............... 297/217, 188, 191, 192, 297/193, 460; 224/148

[56] References Cited

U.S. PATENT DOCUMENTS

| | | | |
|---|---|---|---|
| 2,989,115 | 6/1961 | Egles | 297/217 |
| 3,560,047 | 2/1971 | Davis | 297/192 X |
| 3,627,378 | 12/1971 | Brock | 297/191 |
| 3,671,070 | 7/1972 | Johnson et al. | 296/65 |
| 3,771,827 | 11/1973 | Winfree | 297/192 |
| 4,311,261 | 1/1982 | Anderson | 297/217 X |
| 4,533,050 | 8/1985 | Bake, Jr. | 297/192 X |
| 4,647,109 | 3/1987 | Christophersen | 297/457 |
| 4,974,903 | 12/1990 | Lipschitz et al. | 297/188 |

FOREIGN PATENT DOCUMENTS 944530 6/1956 Fed. Rep. of Germany .

OTHER PUBLICATIONS

Bombardier Inc. *An Integrated Blow-Molded Snowmobile Seat*, 3 pages, 1990, published in Canada.

Primary Examiner—Laurie K. Cranmer

[57] ABSTRACT

A seat assembly is provided for a lawn and garden tractor wherein a fuel tank is an integral component of the seat. A plastic fuel tank is sandwiched between an inner and an outer seat shell to provide a fuel tank which is easily accessible for maintenance and/or replacement. A fuel inlet is provided at the top portion of the seat back facilitating easy and convenient refueling of the tank. The elevated position of the fuel tank provides a head of fuel for vehicles not equipped with fuel pumps, reducing the likelihood of starvation as the vehicle is operated on hillsides and inclines.

19 Claims, 5 Drawing Sheets

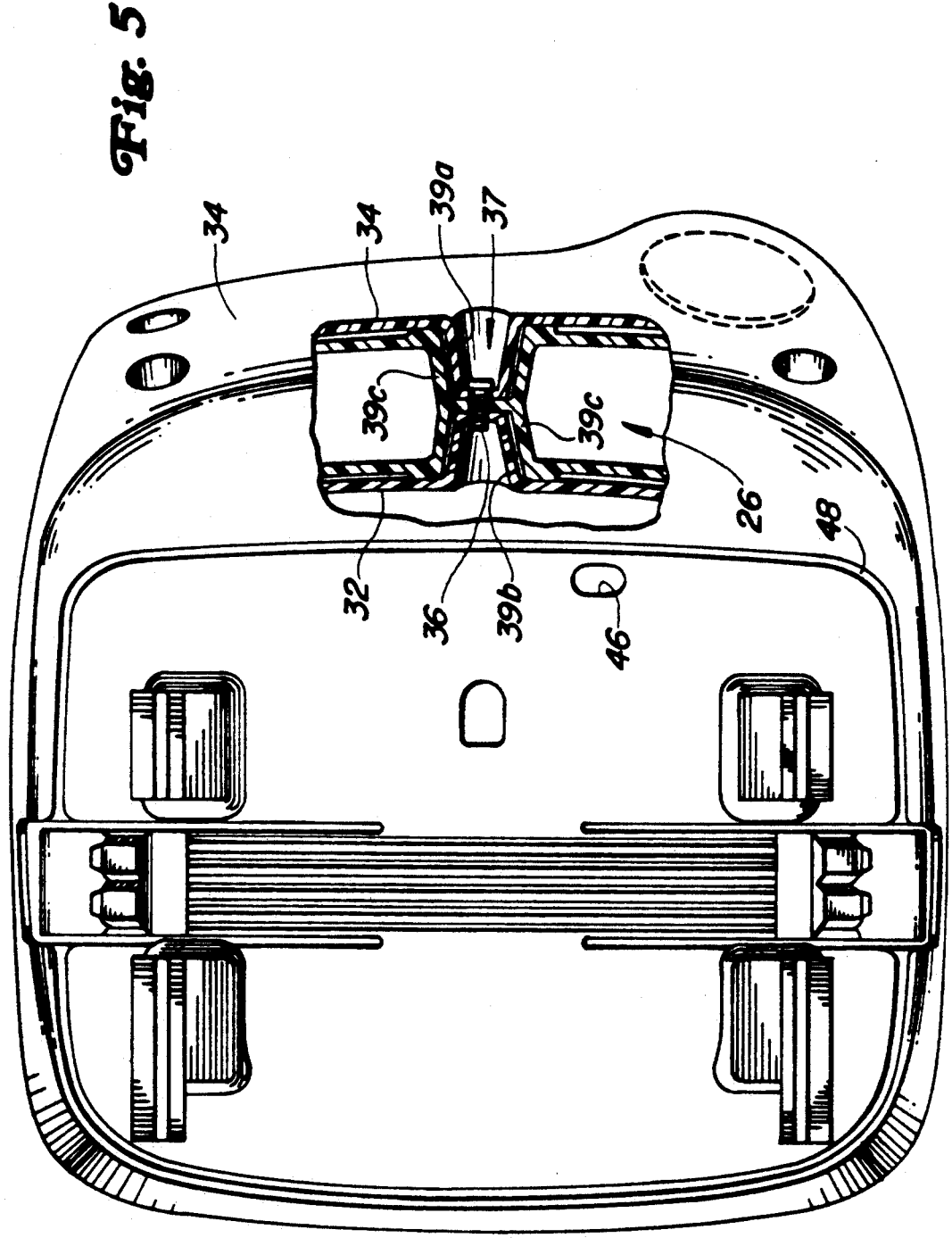

SEAT ASSEMBLY WITH INTEGRAL FUEL TANK

BACKGROUND OF THE INVENTION

1. Field of the Invention

The present invention relates to seat assemblies and more specifically to a lawn and garden seat assembly which includes an internal fuel tank.

2. Description of the Related Art

Typical small vehicles, such as lawn and garden tractors, include fuel tanks which are positioned within the main vehicle structure or body. The tank is accordingly mounted at about the same level or lower than the engine. For engines not equipped with fuel pumps, only the weight of the fuel in the tank and gravity are available to force the fuel to the carburetor. When the vehicle is operating on an incline, the fuel supply may not always be constant.

Further, the tank inlet is often mounted low and can be difficult to use, sometimes resulting in damage occurring to the vehicle body as the tank is filled.

As an alternative, some tanks are mounted at a higher position on the vehicle, but that may provide appearance problems. There have been proposed fuel tanks located within the seat structure for use on small vehicles. Such a structure can provide the head of fuel for a non-fuel pump equipped engines, and make it easier to fill the tank.

One such fuel tank contained within a seat is constructed from two pieces of fiberglass cemented together at their seam. Such seats would appear to require higher fabrication and assembly costs and present potential leakage problems at the seam as the seat flexes during operation. Additionally, failure of such a seam could require that the complete seat be replaced to prevent such leakage.

SUMMARY OF THE INVENTION

It is, therefore, desirable to provide a fuel tank which can be attractively mounted in a position that eliminates the low head of fuel and reduces fuel starvation in non-fuel pump-type vehicles as they operate on inclines.

Further, it would be desirable to provide a fuel tank which would be easy to fill and would not require the operator to bend over during filling of the tank.

Additionally, it would be desirable to provide a fuel tank within a seat which is inexpensive to manufacture and does not require welds and/or assembly of seams.

Further, it is desirable to provide a fuel tank which could be replaced without requiring that other components of the seat assembly be discarded to resolve a fuel tank problem.

BRIEF DESCRIPTION OF THE DRAWINGS

FIG. 5 is a bottom view of the seat assembly with the center bolt connection means illustrated in cross section.

DESCRIPTION OF THE PREFERRED EMBODIMENT

Figure 1:
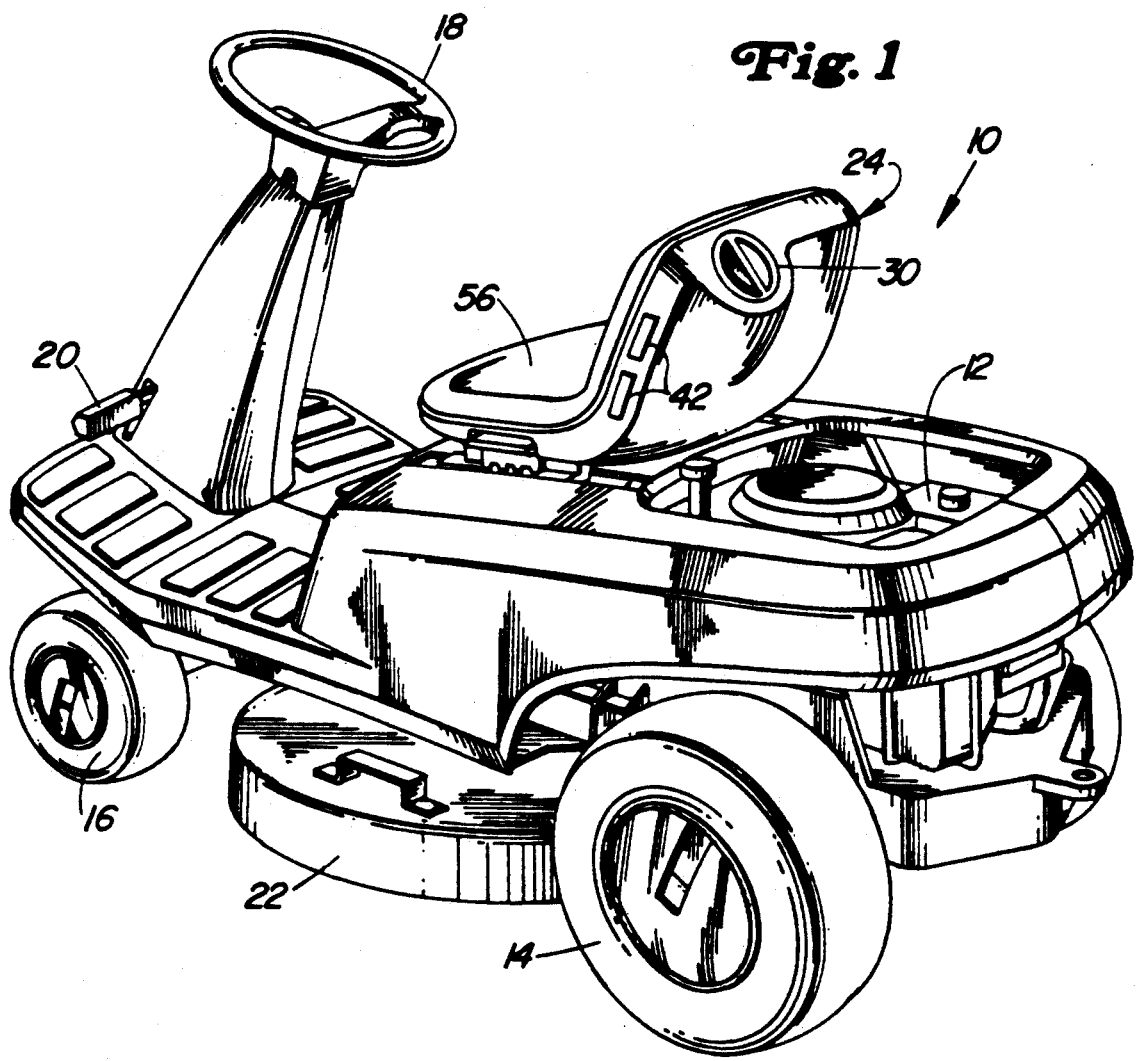
FIG. 1 is a rear elevated perspective view of a rear engine lawn and garden rider equipped with a fuel tank contained within the seat structure.

Looking now to FIG. 1, there is illustrated a lawn and garden-type vehicle 10 equipped with a rearwardly mounted engine 12. The vehicle includes rear drive wheels 14, steerable front wheels 16, a steering wheel 18, clutch and brake pedals 20, and a mower deck 22 carried therebelow. The vehicle 10 is provided with a seat assembly 24 including an internally mounted gas tank 26. The tank 26 includes a filler opening 28 at the top rear portion of the seat 24 and a screw-on cap 30 closing the opening 28.

Figure 2:
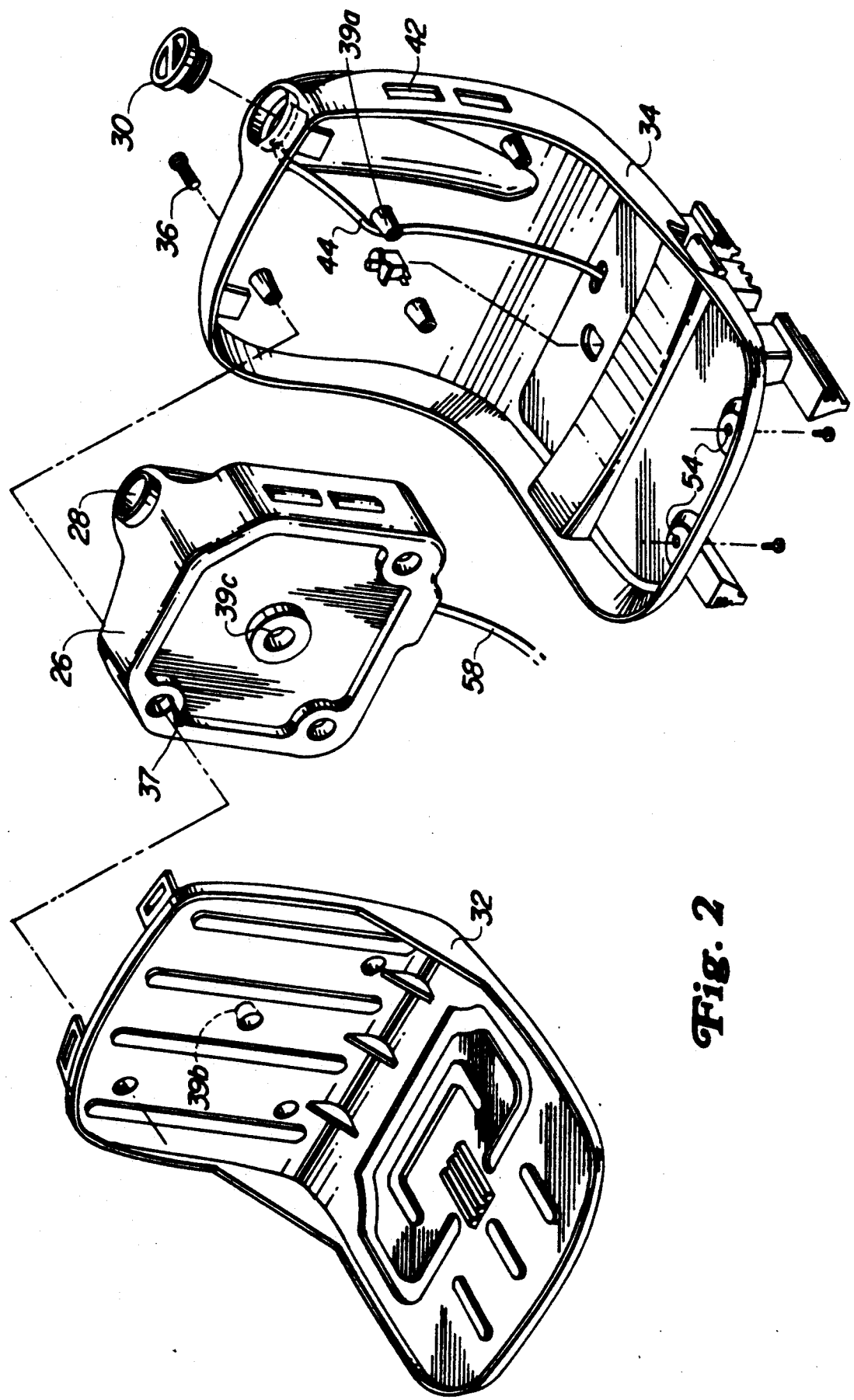
FIG. 2 is an exploded view of the three-piece seat and fuel tank assembly.
Figure 3:
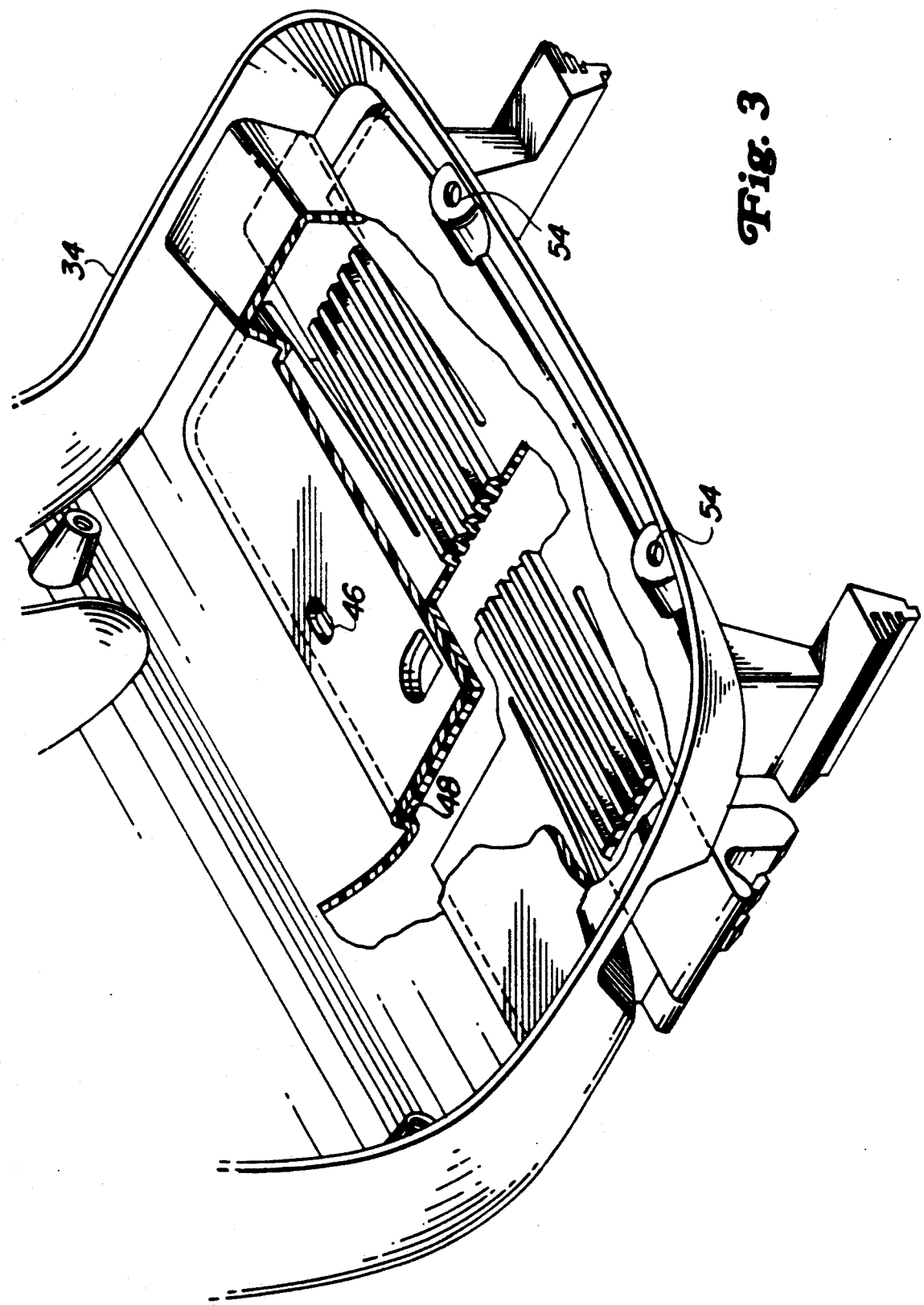
FIG. 3 is an enlarged partial and perspective view of the bottom seat component.

In FIG. 2 the seat assembly 24 is illustrated in an exploded perspective view. The assembly 24 is comprised of first and second seat shells designated 32 and 34 respectively, each shell having respective upstanding back portions for supporting together the back of the operator and generally horizontal lower and forwardly extending portions for together supporting the seat of an operator. The tank, designated 26, is preferably produced by blow molding or rotational molding process and is configured so as to be mounted between the first and second shells 32 and 34. The tank 26 is rectangular in shape and is attached to the rear seat shell 34 as illustrated in FIGS. 2 and 5. In the preferred embodiment, threaded bolt-type structures 36 would be used to secure the seat shell 34, tank 26 and shell 32 together. The bolts 36 would pass through the shell 34, the pinches openings 37 in the tank 26 and be received in nut-like fasteners in the shell 32. The shells 32, 34 and tank 26 are provided with column-like walls 39a, 39b surrounding the bolt passages to transfer loadings or forces from the front shell 32 through the tank 26 and to the back shell 34 as the operator moves. The column walls further provide rigidity to the tank 26 to prevent damage, collapse or compression of the tank and spewing of fuel there out of. At the top portion of the tank 26 is provided the filler inlet or opening 28 which would project through the opening 40 provided in the rear shell 34 and receive the cap 30 for closing the tank 26 during operation.

Also provided at the side of the seat assembly are windows 42 in the seat shell 34 through which the transparent plastic of the molded tank 26 allows the fuel level in the tank to be estimated, thereby eliminating the need for any kind of filler cap gauge or other structure for indicating the amount of fuel left in the tank 26.

The seat shell 34 is provided with an overflow vent hose 44 the fuel opening 40 which would be inserted in the opening designated 46 for discharge of spilled fuel. At the base of the mounting area for the tank 26 in the rear shell 34 is provided a ledge or fuel flow interrupter 48. This deep surface 48 is a change in the inside and outside contour of the seat shell 34 and is provided to cause fuel spilled on the outside rear surface of the shell 34 during refueling to drip off the ledge 48 rather than run down and under the seat before it dripped off the seat. In this way the highly stressed plastic areas below the seat, such as the seat adjusting structures are protected from exposure to the fuel.

In its assembled form, the seat 24 would preferably be covered with or have a cushion 56 permanently bonded to the top shell 32, as is illustrated in FIG. 1.

Looking to FIG. 5, there is illustrated a bottom view of the seat assembly 24 and particularly of the rear shell 34 which would include the vent hole, designated 46, through which the drain tube 44 from the gas tank 26 and fuel line 58 would pass. The filler opening 40 in the rear shell 34 is designated in phantom lines.

Figure 4:
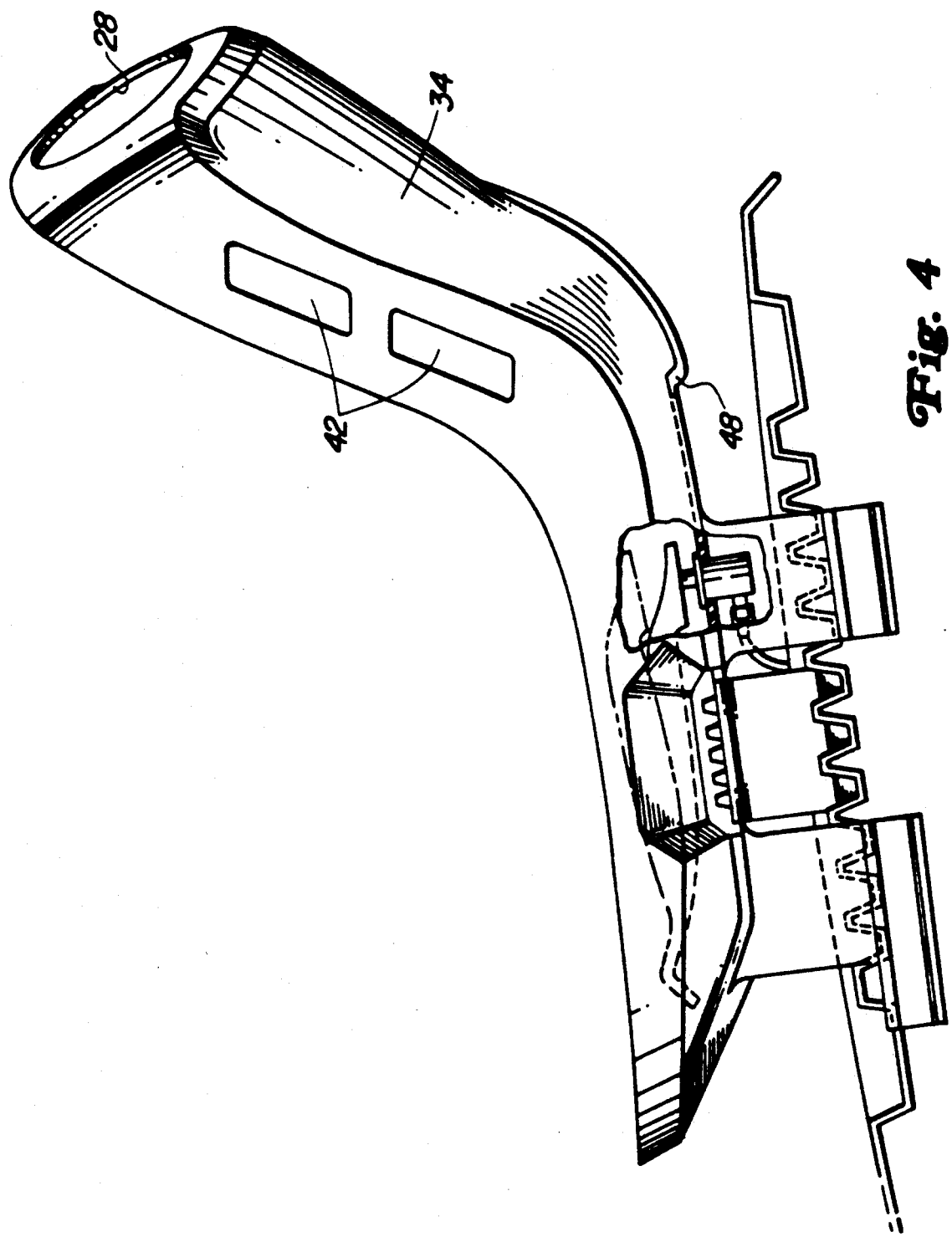
FIG. 4 is a side view of the assembled seat bottom.

In operation, the seat assembly 26 would be as illustrated in FIGS. 1, 4 and 5 and the operator would simply remove the filler cap 30 to refuel the tank 26. While the filler opening 28 is illustrated on one side of the seat 26, it could just as easily be located to the other side of the seat 24. It has been found in the preferred embodiment that the filler opening 28 should be provided on the side of the vehicle 10 opposite to the engine exhaust manifold and muffler.

The seat assembly 24 provides a tank 26 which is an integral component of the assembly 24 and yet which can be easily removed should there be a failure in the tank component itself. The lack of seams in the rotational or blow molded gas tank 26, of course, reduces the likelihood of leakage occurring and of the tank component itself springing a leak. It further reduces the potential stresses on the tank's integrity which could arise as the operator bounces or moves during operation.

With the tank 26 located in the seat 24, the non-fuel pump type of engine, such as are common on lawn and garden-type tractors, is provided with a head of fuel that will maintain flow to the engine even on inclines. Further, the likelihood of spillage onto the body structure and its surfaces is minimized with the location of the filler opening in the tank and seat structure.

With the present invention a seat assembly is provided, including a gas tank wherein a seamless tank is replaceably mounted within the seat structure and one in which the necessary head of fuel is provided for non-fuel pump-type engines commonly used on such small vehicles.

We claim:

1. An improved seat assembly comprised of first and second seat generally L-shaped shell structures, each shell structure including a first upright portion adapted to support the back of an operator, and a second generally horizontal portion adapted to support the seat of an operator,
    the second shell structure being releasably fixed to the first shell structure,
    and a fuel tank separate from and removably receivable between the upright portions of the first and second shell structures.

2. The invention defined in claim 1 wherein the tank includes a filler opening passing through one shell structure.

3. The invention defined in claim 1 wherein the shell structure and tank are comprised of plastic materials.

4. The invention defined in claim 3 wherein the fuel tank is comprised of a blow molded plastic material.

5. The invention defined in claim 1 wherein the fuel tank is seamless.

6. The invention defined in claim 1 wherein the first shell structure is adapted for being attached to a vehicle and the second shell structure is received in the first shell structure and a tank filler opening passes through the upright portion of the first shell structure.

7. The invention defined in claim 6 wherein the second shell structure is adapted to receive a padded seat and back cushion.

8. The invention defined in claim 6 wherein the first shell structure includes a fuel spillage collection and disposal means.

9. The invention defined in claim 1 wherein the tank includes a portion comprised of a translucent material, said portion being viewable through one shell to estimate the fuel remaining in said tank.

10. The invention defined in claim 1 wherein the fuel tank is provided with means for securing the first and second shell structures to it, said means further serving to position the tank relative to the shell structures and to reinforce the tank against collapse as pressure is applied to the upright portion of one shell structure.

11. The invention defined in claim 10 wherein the means for securing includes an opening through the tank with reinforcing means located adjacent that opening.

12. The invention defined in claim 11 wherein a plurality of openings are provided in the tank, including one centrally located therein.

13. The invention defined in claim 11 wherein there is further provided reinforcing means in the shell structure which would be adjacent the opening in the tank.

14. A plastic seat assembly comprised of top and bottom shells, each shell having a generally horizontal first portion joined to a generally upright second portion, the first portion of the bottom shell being adapted to be mounted to a vehicle,
    a seamless plastic fuel tank separate from and removably receivable between the top and bottom shells,
    and means for releasably securing the two shells together to form a seat assembly with the fuel tank sandwiched therebetween.

15. The invention defined in claim 14 wherein the seat assembly is carried by a lawn and garden vehicle and includes a seat cushion permanently secured to the top shell.

16. The invention defined in claim 14 wherein the fuel tank is provided with means for securing the first and second shells to it, said means further serving to position the tank relative to the shells and to reinforce the tank against collapse as pressure is applied to the upright portion of one shell.

17. The invention defined in claim 16 wherein the means for securing includes an opening through the tank with reinforcing means located adjacent the opening.

18. The invention defined in claim 17 wherein a plurality of openings are provided in the tank including one centrally located in the tank.

19. An improved seat assembly comprised of first and second seat shell structures, each shell structure including a first upright portion adapted to support the back of an operator, and a second generally horizontal portion adapted to support the seat of an operator,
    the first shell structure being attachable to a vehicle;
    the second shell structure being releasably receivable with the first shell structure;
    a fuel tank receivable between the upright portions of the first and second shell structures;
    a tank filler opening in the upright portion of the first shell structure; and
    a fuel spillage collection and disposal means included in the first shell structure.

* * * * *